Figure 1:
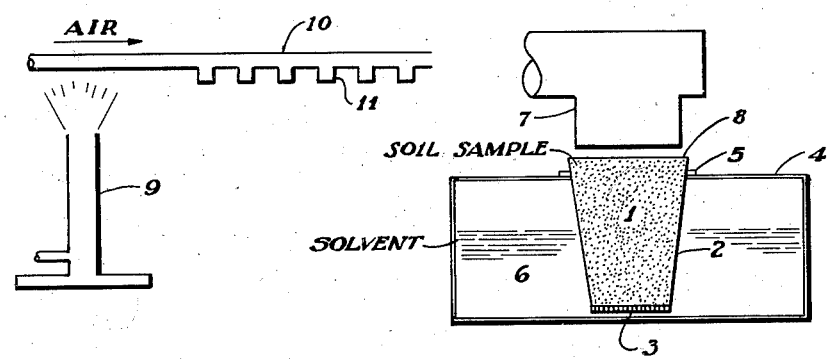

Oct. 19, 1948.  R. M. SQUIRES  2,451,883
GEOPHYSICAL PROSPECTING
Filed Oct. 25, 1945

Rodney M. Squires
INVENTOR

BY John L. Sullivan
AGENT

Patented Oct. 19, 1948

2,451,883

UNITED STATES PATENT OFFICE 2,451,883

GEOPHYSICAL PROSPECTING

Rodney M. Squires, Alice, Tex., assignor, by mesne assignments, to Socony-Vacuum Oil Company, Incorporated, New York, N. Y., a corporation of New York Application October 25, 1945, Serial No. 624,563

10 Claims. (Cl. 250—71)

This invention relates to geochemical exploration for subterranean deposits, such as petroleum oil and natural gas. More particularly, the invention relates to a method of examining soils to determine the proximity of such deposits. Still more particularly, the invention concerns an improved method for determining the fluorescence of soils in order to ascertain the existence and/or location of such deposits.

The significant relationship of soil fluorescence to the presence of underlying petroliferous deposits has already been recognized. Thus, it has been found that the intensity of fluorescence exhibited by soil samples recovered at shallow depths in areas containing deep-seated petroleum deposits is noticeably greater than that shown by samples taken in barren areas. The reason for the increased intensity of soil fluorescence in petroleum producing areas in generally held to be due to the presence in the soil of organic substances which are derived from the underlying deposits.

For the most part, methods heretofore proposed for the measurement of the intensity of soil fluorescence have involved the steps of extracting significant hydrocarbon materials from the soil by means of a solvent and measuring the intensity of fluorescence of the extract solution thus obtained. However, a disadvantage of this method is that it requires the use of a nonfluorescing solvent which is apt to be a poor solvent for certain of the significant organic materials to be extracted from the soil. Furthermore, since the number of samples examined in any survey is generally quite large, the preparation of the extract solutions requires an uneconomical expenditure of time, as well as the use of relatively expensive apparatus.

In other prior art procedures, fluorescence of the soil is measured directly, i. e., without the use of solvents. By these procedures, however, misleading results are often obtained, principally because the magnitude of the fluorescence due to the presence of significant organic materials in the soil is often so small that significant variations in fluorescence from sample to sample are extremely difficult to detect and measure. The present invention avoids the difficulties encountered in the foregoing methods by carrying out the fluorescence measurements in the novel and advantageous manner hereinafter described.

An object of the present invention is the provision of a simple and economical method for the analysis of soils for significant organic materials which are related to the presence of petroleum deposits. A further object is to provide a method of improved accuracy and dependability for measuring the fluorescence of soils. Another object of the invention is to provide means for magnifying the intensity of fluorescence of soils whereby the detection and measurement of anomalies related to the existence of petroliferous deposits is greatly facilitated. Other objects and advantages will become apparent from the following description of the invention.

I have found that the results obtained in surveys in which the fluorescence of the soil is relied on as the indicating factor in ascertaining the proximity of a petroleum deposit may be greatly improved by treating the soil samples prior to measuring their fluorescence in the novel manner hereinafter proposed.

The essential feature of the presently proposed method is the provision of means for treating the soil samples prior to measuring their fluorescence whereby significant fluorescent organic constituents of the samples are concentrated on the surfaces thereof. A major advantage of this treatment of the soil prior to conducting a fluorescence measurement thereon is that it causes the fluorescence of the soil per unit area of surface exposed for the fluorescence test to be greatly increased in magnitude. For this reason the sensitivity of the fluorescence measurement is greatly increased over that of prior art methods. Accordingly, significant anomalies in the intensity of fluorescence from sample to sample are much more pronounced and readily discernible, so that a truly representative picture of the area under survey with respect to the presence and/or location of a petroleum deposit is obtained.

The method of the present invention essentially comprises the treating of a suitably large volume of a soil sample with an organic solvent so as to extract organic constituents from the body of said soil sample and produce a deposition of these constituents on a relatively small area of the sample surface. This may be conveniently accomplished by placing the soil sample in a vessel large enough to hold the amount of sample ordinarily required, i. e., from 25 to 50 grams. This vessel should have an opening whose cross-sectional area is relatively small compared to the total enclosed wall area of the vessel. When the vessel is filled with sample a fixed surface area of the sample will be exposed to the atmosphere at the opening. The solvent is added to the sample vessel by means of a second opening in the sample vessel as hereinafter described in an amount at least sufficient to saturate the sample. The solvent is then removed rom contact with the sample by vaporizing it from the exposed sample surface. During the vaporization the temperature of the vessel as a whole is maintained below that which would allow any substantial vaporization of the solvent below the surface of the sample exposed at the vessel opening and in any case below the boiling point of the solvent, while at the same time the sample surface is warmed, such as by a gentle stream of heated air. The evaporation of solvent from the sample surface produces an upward movement of liquid solvent, containing the dissolved organic materials, from the body of the sample to the surface, where they are deposited. Eventually all of the solvent is evaporated, leaving a thin even layer of organic residue on the exposed sample surface. The solvent should be vaporized as completely as practically possible from the exposed surface although minor amounts may remain absorbed or otherwise retained in the body of the sample.

After effecting the concentration of the organic contents of the soil sample on the sample surface as above described, the fluorescence of the sample is measured and the values found are compared in relation to the respective sampling sites in the field in the manner well known in order to determine the presence and/or location of a sought deposit.

A complete understanding of the nature of my invention and the manner of operation thereof may be had by referring to the accompanying drawings in which suitable apparatus for conducting the invention is diagrammatically illustrated.

In Figure 1, there is shown a soil sample 1 which has been dried and its particle size reduced to pass a 30 mesh screen, after which treatment it is placed in a suitable vessel 2 having a perforated bottom 3 such as a Gooch crucible. The crucible is in turn set into a second vessel or container 4 which is provided with an opening in the top thereof to receive the sample vessel. The diameter of the opening is somewhat smaller than that of the upper portion of the sample vessel so that the vessel wall fits snugly against the edge of the container opening. To insure a substantially vapor-tight seal between the wall of the sample vessel and the edge of the container a suitable collar 5 may be employed which is tightly fitted to the wall of the sample vessel and which covers the edge of the container opening. As shown in the drawing, when the sample vessel is in place in the container, the bottom of the vessel comes close to, but does not touch, the bottom of the container. There is disposed inside the container a measured quantity of an organic solvent material 6 such as carbon tetrachloride, chloroform, or the like. The solvent enters the vessel 1 from the container via the holes in the bottom thereof and rises through the soil sample by capillary action, saturating the sample and extracting therefrom the organic substances contained in the soil.

The container and sample vessel arranged as shown are placed beneath an air jet 7 from which a stream of warm air is gently passed in contact with the surface 8 of the soil sample. The temperature of the air is maintained substantially constant at a value above that which will cause appreciable vaporization of the solvent from the surface of the sample but below that which would vaporize or decompose the signficant organic substances extracted from the soil. Preferably the temperature is maintained below the boiling point of the solvent employed. For example, where carbon tetrachloride is employed a satisfactory temperature is about 30° C. The air may be heated by suitable means, such as a burner 9, as it passes through the conduit 10. The conduit 10 may desirably have several or more jets, 11, for the simultaneous treatment of a plurality of samples. The warm air passing over the surface of the sample induces relatively rapid evaporation of the volatile solvent material from the surface of the sample, causing the solvent in the container to percolate up by capillary action through the body of the sample in the crucible, additional solvent being drawn into the sample vessel from container 3 through the holes in the bottom thereof. The solvent carries with it the signficant organic materials extracted and leached from the body of the sample. As the solvent is evaporated from the sample surface, the organic substances are deposited on the soil surface. When the solvent is completely evaporated, a thin, even layer of organic residue will be deposited on the sample surface. After the significant organic materials have been thus concentrated on the sample surface, the sample is ready for the fluorescence measurement.

Figure 2:
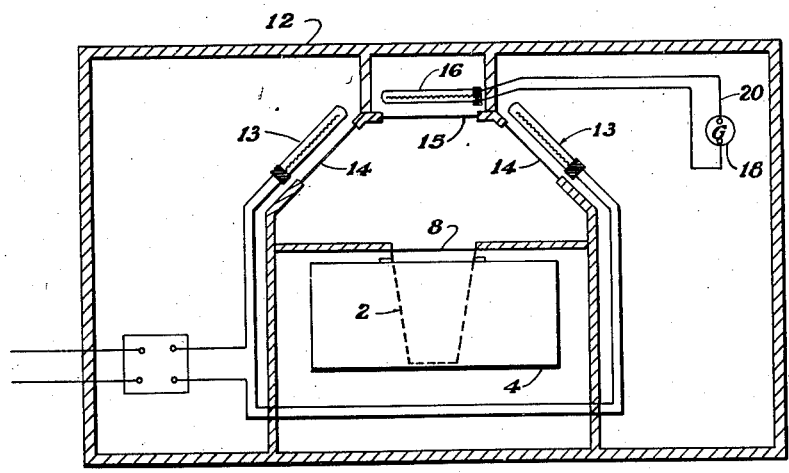

Referring particularly to Figure 2, to conduct the fluorescence measurement the container 4, having the sample vessel 2 set therein, is placed in position in fluoroscope box 12. The fluoroscope case is closed, and the surface 8 of the sample is irradiated with ultraviolet light by suitable means, such as Mineralight quartz mercury vapor lamps 13. Suitable filters 14, such as Corex No. 9863, are disposed between the light source and the sample to absorb substantially all of the visible light. Another filter 15 is placed between the sample and detector 16 to reduce further the amount of visible light emitted by the source and reflected by the sample surface. This filter also serves to isolate selected portions of the visible fluorescent spectrum. A suitable filter for this purpose is a Corning No. 3486, which cuts out wavelengths below 0.5 micron. The detector 16 may be a high vacuum electron multiplier photo-tube, such as an R. C. A. No. 931A, the intensity of the output current of which is a linear function of the exciting illumination. The output is measured using a spotlight galvanometer 18 connected to the detector tube through the circuit 20.

Although a number of different types of vessels may be used for holding the sample, I have found the use of a No. 3 Gooch crucible to be convenient and highly satisfactory. In any case, the vessel used should be of a shape such that the ratio of the volume of sample treated (i. e., the volume which fills the vessel) to the area of surface exposed for the deposition of extracted organic soil constituents thereon is at least about 2½ to 1, in order to effect a beneficial increase in the magnitude of the fluorescence measurement values in accordance with the principle of my invention. For example, where the cross-sectional area of the vessel opening for exposure of sample surface is 10 cms.$^2$, the volume of the vessel should be approximately 25 cms.$^3$, if satisfactory results are to be obtained. Since the amount of sample taken for treatment is that required to fill the sample vessel, when using a No. 3 Gooch crucible this amount of sample, ground to 30 mesh, will weight in the neighborhood of 35 grams. I have found that substantially complete extraction of the organic constituents of this amount of sample by my method requires the use of about 50 cc. of solvent, as a general rule, although a greater or lesser amount may be employed where it is felt desirable to do so. Also, to make the fluorescence values properly comparable, a constant amount of solvent should be used for the treatment of all the samples in a particular survey.

Another factor which exerts a significant effect on the intensity of fluorescence is the area of sample surface exposed for the deposition of extracted material thereon. Obviously, the smaller this surface is, the greater will be the fluorescence per unit of surface area. By my method, however, no correction for variation in this surface area from sample to sample is necessary, since by this method this area is conveniently maintained constant for all of the samples by the use of a standard sized crucible, such as a No. 3 Gooch, as already mentioned, and the fluorescence of this fixed area is measured in each instance. Accordingly then, only one correction factor need be applied to the fluorescence values obtained by my method, that is, a correction for the weight of sample used. Thus, since the weight of sample taken in each instance is for convenience that required to fill the crucible, the weight of sample taken will vary somewhat, the intensity of fluorescence being affected accordingly, so that the fluorescence values should be corrected to some standard weight of sample. I have found it convenient for this purpose to correct the fluorescence values to a value equivalent to 100 grams of sample in each case.

After the fluorescence values have been obtained and corrected on the basis of the weight of sample treated, as described above, they are correlated in relation to the respective sampling locations by any of the well known methods in order to detect possible anomalies indicative of the presence of a petroliferous deposit. For example, the fluorescene values may be plotted as a function of sampling site where the samples were taken from points located on a traverse or on a plurality of traverses in a prospect area; or, where the samples have been collected from sampling points set out according to some different plan or pattern, the results of the fluorescence measurements may be correlated by locating them with respect to the respective sampling points on a map of the survey area.

Obviously, the fluorescence measurements of my method provide purely relative values with respect to the concentration of significant fluorescent organic materials in the soil; however, these values are all that is required for the success of the method, since the fluorescence values are directly proportional to the concentration of significant organic materials in the soil.

It will be evident to those skilled in the art that the method of my invention provides several distinct advantages over the practice of the prior art for measuring the fluorescence of soils in relation to petroleum deposits. Thus, the solvent used need not be nonfluorescent in character since the fluorescence measurements are not conducted on solvent extract solutions, but directly on the soil surface after the significant constituents have been concentrated thereon. Another advantage of my process is that it provides measurement values of increased magnitude by concentrating the significant materials on the exposed sample surface. These higher values allow for a more rapid interpretation of the results and also provide a more accurate representative picture of the area under survey with respect to the existence and location of a deposit.

In describing my invention, I have indicated the use of a particular form of apparatus and mentioned specific compounds as suitable for use as solvent materials; however, it should be understood that the invention is not to be construed as limited to the use of the apparatus or materials so mentioned, but only as indicated in the appended claims.

Having now fully described my invention, what I claim as new and useful and wish to secure by Letters Patent is:

I claim:

1. A method of prospecting for subterranean petroliferous deposits which comprises collecting a number of soil samples at strategic locations in a prospect area, similarly and separately treating said samples by contacting with an organic solvent to extract significant organic constituents related to the sought deposits therefrom, subsequently removing said solvent from contact with said samples by evaporating said solvent from a relatively small fixed area of sample surface exposed to the atmosphere whereby the significant organic soil substances extracted from said sample are deposited on the exposed surface thereof, determining the fluorescence of the exposed sample surfaces, and correlating the fluorescence values obtained for the different samples in relation to the respective sampling locations in order to derive information as to the presence and location of a sought deposit.

2. A method of prospecting for buried petroliferous deposits which comprises collecting a number of soil samples from spaced points in a prospect area, similarly treating a known amount of each sample by contacting with a fixed amount of an organic solvent in a vessel having an opening adapted to expose a fixed surface area of sample to the atmosphere, said area being relatively small compared to the volume of the sample contained in said vessel, evaporating said solvent from said exposed sample surface until substantially all of said solvent has been removed from contact with said sample and vaporized whereby the fluorescent organic constituents of said sample related to the existance of a petroliferous deposit are deposited on the exposed surface of said sample, measuring the fluorescence of the exposed surface of said sample and comparing the fluorescence values found for the different samples in relation to their respective sampling locations on the basis of the weight of sample treated in order to derive information as to the presence and location of a sought deposit.

3. The method of prospecting for buried petroliferous deposits which comprises collecting a number of soil samples from spaced sites in a prospect area, similarly and separately treating a known amount of each sample by soaking with a fixed amount of organic solvent in a vessel having an opening adapted to expose a fixed surface area of the sample to the atmosphere whereby organic constituents of said sample are extracted therefrom by solution in said solvent, removing the solvent from contact with said sample by maintaining the temperature of the atmosphere adjacent said exposed sample surface at a level sufficiently high to cause vaporization of said solvent from said sample surface at an appreciable rate, said vaporization inducing a movement of the liquid extract solution from the body of the sample upwards to the exposed sample surface, continuing to evaporate said solvent from said surface until all of said solvent has been removed from contact with said sample and evaporated, whereby the extracted organic constituents of said sample, not appreciably vaporizable at the temperature maintained at the sample surface, are deposited on said surface, measuring the fluorescence of the exposed surface of said sample and comparing the fluorescence values found for the different samples in relation to their respective sampling sites on the basis of the weight of sample taken for treatment to derive information as to the presence and location of a petroliferous deposit.

4. In the method of prospecting for subterranean petroliferous deposits in which the fluorescence of soil samples collected at selected sites in a prospect area is measured and the values obtained related to the respective sampling sites in order to derive indications as to the presence and location of a sought deposit, the improvement which comprises similarly treating each sample prior to measuring the fluorescence thereof by soaking with an organic solvent to extract therefrom organic fluorescent soil constituents related to the presence of petroleum deposits, removing the solvent from contact with said sample by evaporating the solvent from a relatively small surface area of sample exposed to the atmosphere under such conditions that after all of said solvent has been removed and vaporized, said extracted organic constitutents are deposited on said sample surface.

5. The method of preparing a soil sample for measurement of the fluorescence thereof as an indication of its organic content which comprises extracting the organic constituents of said sample by soaking said sample with an organic solvent, thereafter removing the solvent from contact with the sample by evaporating said solvent from a relatively small portion of the sample surface exposed to the atmosphere, maintaining the temperature of the atmosphere adjacent said exposed sample surface during the vaporization of said solvent sufficiently high to vaporize the solvent from the sample surface at an appreciable rate, but below the boiling point of the solvent and the decomposition point of the extracted constituents, continuing to evaporate the solvent from the sample until the solvent has been substantially completely vaporized and removed from contact with the sample whereby the extracted constituents of the sample are deposited on the exposed sample surface, and thereafter measuring the fluorescence of the sample surface.

6. The method of concentrating organic constituents of soil on the soil surface prior to measuring the fluorescence of said soil which comprises soaking a known quantity of soil sample with a predetermined amount of an organic solvent in a vessel having an opening suitable to expose a fixed area of the soil surface to the atmosphere, said exposed area being relatively small compared to the internal wall area of said vessel, said known quantity of soil being sufficient to approximately fill said vessel, removing the solvent from contact with said soil by evaporation of the solvent from said exposed soil surface by maintaining the temperature of the atmosphere adjacent said exposed surface at a level sufficiently high to allow vaporization of said solvent from said surface at an appreciable rate but below the boiling point of said solvent and sufficiently low to avoid decomposition of the organic constituents extracted from the soil by said solvent, whereby the evaporation of solvent at the sample surface causes the liquid extract solution in contact with the body of the sample to percolate towards the sample surface, continuing to evaporate said solvent from said surface until all of the solvent has been removed from contact with said sample, whereby organic constituents extracted by said solvent but not vaporizable at the temperature maintained at the exposed sample surface are deposited on said surface.

7. The method of preparing a soil sample for measurement of the fluorescence thereof as an indication of its organic content which comprises placing said sample in a vessel provided with at least one opening, but only one opening adapted to expose a fixed surface area of the sample to the atmosphere and soaking said sample with a predetermined amount of organic solvent to extract organic materials contained in said sample therefrom, removing the solvent from contact with the sample by evaporating said solvent from the sample surface exposed to the atmosphere by maintaining the partial pressure of solvent in the atmosphere adjacent said exposed sample surface below the vapor pressure of the solvent, continuing said evaporation until all of the predetermined amount of solvent is removed from said sample whereby said extracted organic materials are deposited on said exposed sample surface, and thereafter measuring the fluorescence of the sample surface.

8. The method of preparing a soil sample for measurement of the fluorescence thereof as an indication of its organic content which comprises placing said sample in a vessel provided with more than one opening, but only one opening adapted to expose a fixed surface area of the sample to the atmosphere and soaking said sample with a predetermined amount of organic solvent to extract organic materials contained in said sample therefrom, removing the solvent from contact with the sample by evaporating said solvent from the sample surface exposed to the atmosphere by maintaining the partial pressure of solvent in the atmosphere adjacent said exposed sample surface below the vapor pressure of the solvent, supplying additional solvent up to a predetermined amount to said vessel, for soaking said sample as the solvent is evaporated from said sample surface, via at least one opening other than the opening at which the sample surface is exposed, continuing said evaporation until all of the predetermined amount of solvent has been added to and removed from contact with said sample whereby said extracted organic materials are deposited on said exposed sample surface, and thereafter measuring the fluorescence of the sample surface.

9. A method of prospecting for buried petroliferous deposits which comprises collecting a number of soil samples from spaced points in a prospect area, similarly treating a known amount of each sample by contacting with a fixed amount of an organic solvent in a vessel having an opening adapted to expose a fixed surface area of sample to the atmosphere, said exposed area being relatively small compared to the internal wall area of said vessel and said known quantity of soil being sufficient to approximately fill said vessel, evaporating said solvent from said exposed sample surface until all of said solvent has been removed from contact with said sample and vaporized whereby the fluorescent organic constituents of said sample related to the existence of a petroliferous deposit are deposited on the exposed surface of said sample, measuring the fluorescence of the exposed surface of said sample and comparing the fluorescence values found for the different samples in relation to their respective sampling locations on the basis of the weight of sample treated in order to derive information as to the presence and location of a sought deposit.

10. The method of preparing a soil sample for measurement of the fluorescence thereof as an indication of its organic content which comprises extracting the organic constituents of said sample by soaking said sample with an organic solvent in a vessel adapted to expose only a relatively small fixed portion of the potential total surface area of the sample to the atmosphere, thereafter removing the solvent from contact with the sample by evaporating said solvent from said exposed surface area, maintaining the temperature of the atmosphere adjacent said exposed sample surface during the evaporation of said solvent sufficiently high to vaporize the solvent from the sample surface at an appreciable rate, but below the boiling point of the solvent and the decomposition point of the extracted constituents, continuing to evaporate the solvent from the sample surface until the solvent has been completely vaporized and removed from contact with the sample, whereby organic substances extracted from the body of the sample are deposited and concentrated on the exposed surface thereof, and thereafter measuring the fluorescence of the sample surface.

RODNEY M. SQUIRES.

REFERENCES CITED

The following references are of record in the file of this patent:

UNITED STATES PATENTS

| Number | Name | Date |
| --- | --- | --- |
| 2,213,905 | Clark | Sept. 3, 1940 |
| 2,227,438 | Campbell | Jan. 7, 1941 |
| 2,305,082 | Hocott | Dec. 15, 1942 |

OTHER REFERENCES

"Bulletin of the National Research Council," C. A. Hoegentogler, volume 6, part 4, August, 1923, Number 35. Published by National Academy of Sciences, Washington, D. C. (Copy in Div. 59.)